US008438208B2

(12) United States Patent  
Olson et al.

(10) Patent No.: US 8,438,208 B2  
(45) Date of Patent: May 7, 2013

(54) PROCESSOR AND METHOD FOR IMPLEMENTING INSTRUCTION SUPPORT FOR MULTIPLICATION OF LARGE OPERANDS

(75) Inventors: Christopher H. Olson, Austin, TX (US); Jeffrey S. Brooks, Austin, TX (US); Robert T. Golla, Round Rock, TX (US); Paul J. Jordan, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 992 days.

(21) Appl. No.: 12/488,372

(22) Filed: Jun. 19, 2009

(65) Prior Publication Data

US 2010/0325188 A1   Dec. 23, 2010

(51) Int. Cl.
*G06F 7/52*   (2006.01)
*G06F 7/38*   (2006.01)

(52) U.S. Cl.
USPC ........... 708/625; 708/490; 708/501; 708/503; 708/523; 708/620

(58) Field of Classification Search .................. None
See application file for complete search history.

(56) References Cited

U.S. PATENT DOCUMENTS

| | | | |
|---|---|---|---|
| 7,627,114 B2 | 12/2009 | Chen | |
| 7,664,810 B2 | 2/2010 | Crispin | |
| 7,693,926 B2 | 4/2010 | Mathew | |
| 7,694,045 B2 | 4/2010 | Thomas | |
| 7,725,624 B2 | 5/2010 | Feghali | |
| 2004/0267855 A1 | 12/2004 | Shantz et al. | |
| 2008/0065714 A1 | 3/2008 | Fishcher | |
| 2009/0100120 A1 | 4/2009 | Gokay | |
| 2010/0023571 A1 | 1/2010 | Furukawa | |

OTHER PUBLICATIONS

P.G. Comba, "Exponentiation cryptosystems on the IBM PC," IBM Systems Journal, vol. 29, No. 4, 1990.
U.S. Appl. No. 12/790,074 entitled "Processor and Method Providing Instruction Support for Instructions That Utilize Multiple Register Windows" filed May 28, 2010.
Eberle, et al., "Accelerating Next-Generation Public-Key Cryptosystems on General-Purpose CPUs," IEEE Computer Society, 2005, pp. 52-59.
Eberle, et al., "A Public-Key Cryptographic Processor for RSA and ECC," Proceedings of the 15th IEEE International Conference on Application-Specific Systems, Architectures and Processors; Sep. 2004, pp. 98-110.

*Primary Examiner* — Scott Sun
(74) *Attorney, Agent, or Firm* — Meyertons, Hood, Kivlin, Kowert & Geotzel, P.C.; Anthony M. Petro

(57) ABSTRACT

A processor including instruction support for implementing large-operand multiplication may issue, for execution, programmer-selectable instructions from a defined instruction set architecture (ISA). The processor may include an instruction execution unit comprising a hardware multiplier datapath circuit, where the hardware multiplier datapath circuit is configured to multiply operands having a maximum number of bits M. In response to receiving a single instance of a large-operand multiplication instruction defined within the ISA, wherein at least one of the operands of the large-operand multiplication instruction includes more than the maximum number of bits M, the instruction execution unit is configured to multiply operands of the large-operand multiplication instruction within the hardware multiplier datapath circuit to determine a result of the large-operand multiplication instruction without execution of programmer-selected instructions within the ISA other than the large-operand multiplication instruction.

20 Claims, 8 Drawing Sheets

PROCESSOR AND METHOD FOR IMPLEMENTING INSTRUCTION SUPPORT FOR MULTIPLICATION OF LARGE OPERANDS

BACKGROUND

1. Field of the Invention

This invention relates to processors and, more particularly, to the implementation of processor support for multiple-precision arithmetic.

2. Description of the Related Art

Securing transactions and communications against tampering, interception and unauthorized use has become a problem of increasing significance as new forms of electronic commerce and communication proliferate. For example, many businesses provide customers with Internet-based purchasing mechanisms, such as web pages via which customers may convey order and payment details. Such details often include sensitive information that might be subject to misuse if intercepted by a third party.

To provide a measure of security for sensitive data, cryptographic algorithms have been developed that may allow encryption of sensitive information before it is conveyed over an insecure channel. The information may then be decrypted and used by the receiver. However, as the performance of generally available computer technology continues to increase (e.g., due to development of faster microprocessors), less sophisticated cryptographic algorithms become increasingly vulnerable to compromise.

Cryptographic algorithms are continually evolving to meet the threat posed by new types of attacks. In particular, the use of increased key sizes may help bolster the security of a given algorithm, for example by increasing its resistance to a brute-force attack. However, computational workload can increase dramatically as key sizes increase. For example, the use of large key sizes may require an algorithm to perform arithmetic operations on operands that greatly exceed the typical operand size supported by general purpose processor hardware.

SUMMARY

Various embodiments of a processor and method for instruction support for multiplication of large operands are disclosed. In one embodiment, a processor includes an instruction fetch unit that may be configured to issue, for execution, programmer-selectable instructions from a defined instruction set architecture (ISA). The processor may also include an instruction execution unit that includes a hardware multiplier datapath circuit. The hardware multiplier datapath circuit may be configured to multiply operands having at most a maximum number of bits M.

The instruction execution unit may be configured to receive instructions for execution from the instruction fetch unit. In particular, the instruction execution unit may receive a single instance of a large-operand multiplication instruction defined within the ISA, where at least one of the operands of this instruction includes more than the maximum number of bits M supported by the hardware multiplier datapath circuit. In response to receiving this instruction, the instruction execution unit may be configured to multiply operands of the large-operand multiplication instruction within the hardware multiplier datapath circuit to completely determine a result of the instruction, such that to determine the result, execution of no programmer-selected instruction within the ISA other than the large-operand multiplication instruction is required.

Figure 1:
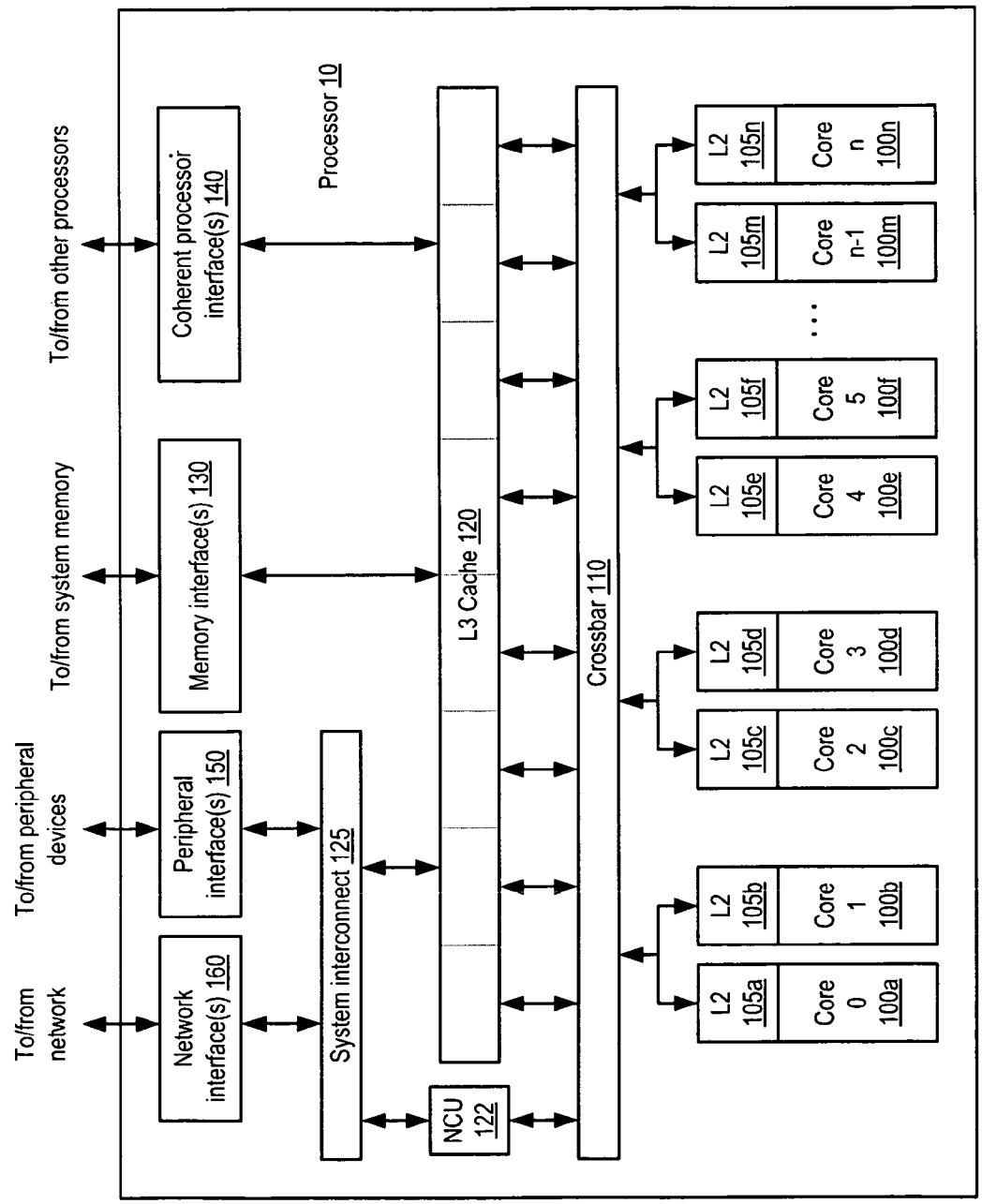
FIG. 1 is a block diagram illustrating one embodiment of a multithreaded processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, instruction support for large-operand multiplication is explored. First, an overview is provided of one type of multithreaded processor in which such instruction support may be provided. Next, large-operand multiplication is discussed generally. Particular embodiments of multiplier datapath and control logic are then described, as well as embodiments of large-operand multiplication instructions and their execution. Finally, an example system embodiment including a processor that may implement instruction-level support for large-operand multiplication is discussed.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC®. ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 10 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
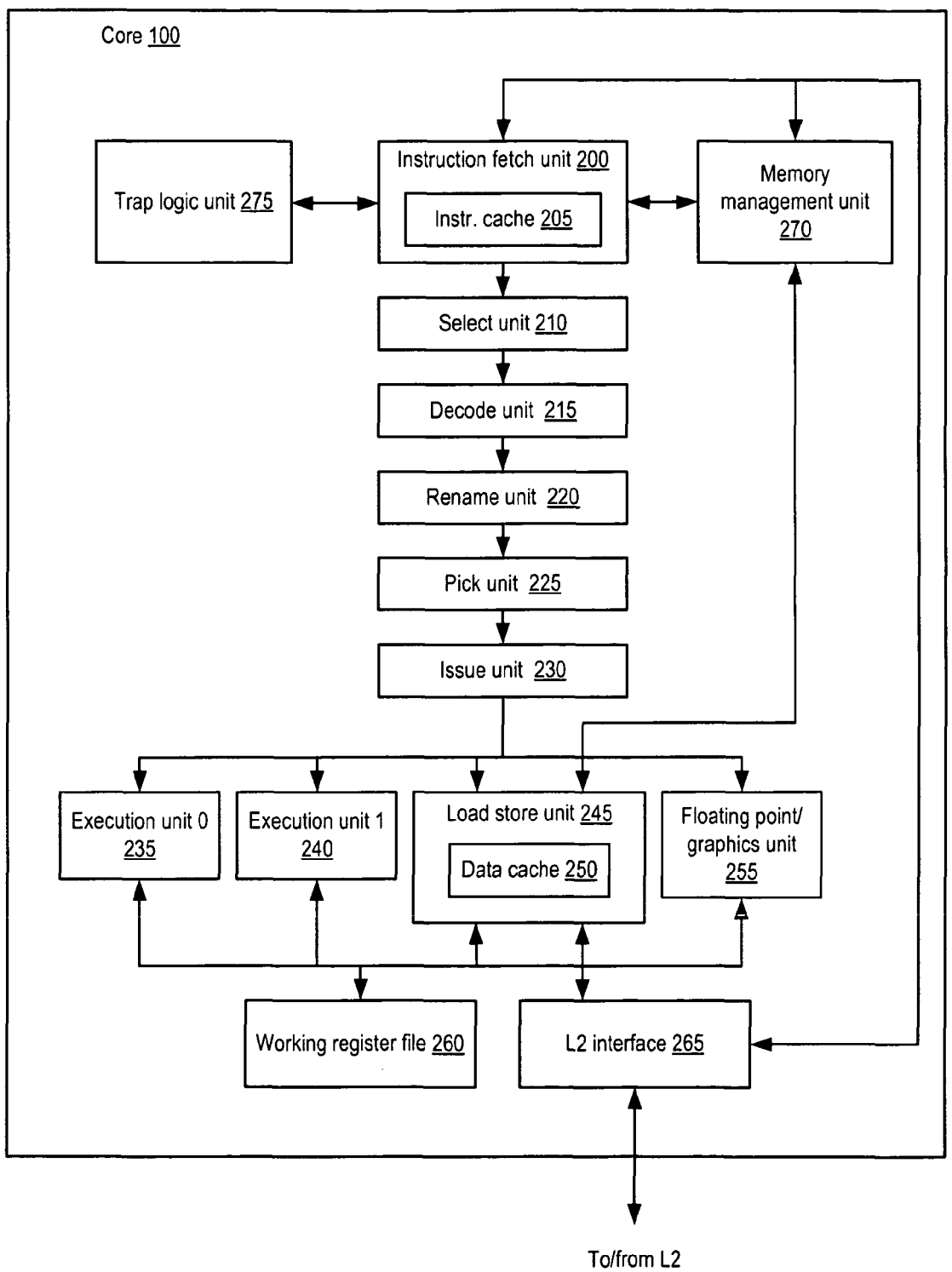
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may be not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Multiplication of Large Operands

As noted above, in some embodiments FGU 255 may be configured to provide hardware support for cryptographic operations including encryption/decryption and hashing algorithms. Certain types of cryptographic operations may perform operations on operand values that are significantly larger than the width of the datapath provided by core 100. For example, the Rivest-Shamir-Adleman (RSA) public-key cryptographic algorithm may employ lengthy cipher keys having 1024, 2048, 4096, or other numbers of bits. During its course of operation, the RSA algorithm may perform modular exponentiation operations on operands that may be at least as wide as the cipher key. These operations may be implemented using integer multiplication, necessitating multiplication of 1024-bit or larger operands. Other types of cryptographic algorithms, such as Elliptic Curve Cryptography (ECC), may similarly require multiplication of large operands.

However, as the width of the input operands increases, the implementation cost of a hardware multiplier (in terms of, e.g., die area and power consumption) typically grows by at least the square of the operand width. Thus, it is uncommon for a processor to provide hardware support for multiplication of operands larger than 64 or 128 bits. As described in greater detail below, multiplication of "large operands"-as used herein, operands that are wider than the processor hardware natively supports-may be accomplished through repeated application of the multiplication operations actually implemented by the processor. Multiplication of large operands may also be referred to herein as multiple-precision multiplication.

In some embodiments, a processor may implement a single large-operand multiplication by executing an instruction sequence that includes multiple instances of instructions defined within the processor's ISA. In these embodiments, to perform a large-operand multiplication, a programmer may define an appropriate sequence of instructions that may be fetched from memory and executed by the processor, such that upon completion of the sequence, the multiplication result is complete. For example, the processor's ISA may define general-purpose integer instructions such as integer multiply, shift, arithmetic, and Boolean operations that may be individually issued for execution. In some embodiments, the processor's ISA may define special-purpose instructions designed to facilitate the particular task of large-operand multiplication. For example, an individual special-purpose instruction might combine several aspects of multiply, shift, and add operations that are specific to the context of large-operand multiplication. As a result, a sequence of special-purpose instructions that is configured to implement a large-operand multiplication may be shorter than an equivalent sequence of general-purpose instructions, and thus may typically execute more quickly than the latter sequence.

Processors that rely on sequences of executable instructions to implement large-operand multiplication may present certain implementation challenges, particularly in processor embodiments that support multithreaded, speculative, out-of-order execution of instructions. For example, it may be difficult for scheduling hardware to ensure that the multiple instructions execute in a consistent manner with respect to architectural state, while ensuring that the performance of other threads is not unduly affected. In the following discussion, embodiments of core 100 are described that are configured to provide single-instruction support for large-operand multiplication. That is, in the described embodiments, a large-operand multiplication may be accomplished through execution of a single instruction, in a manner that is analogous (from a programmer's perspective) to execution of an ordinary integer or floating-point multiplication using the native operand width supported by the multiplier hardware. In some embodiments, as discussed below, core 100 may be configured to provide single-instruction support for large-operand multiplications having varying operand widths (e.g., for operands that are some multiple of 64 bits). Such an instruction may also be referred to as a multiple-precision multiplication (or MPMUL) instruction.

Figure 3:
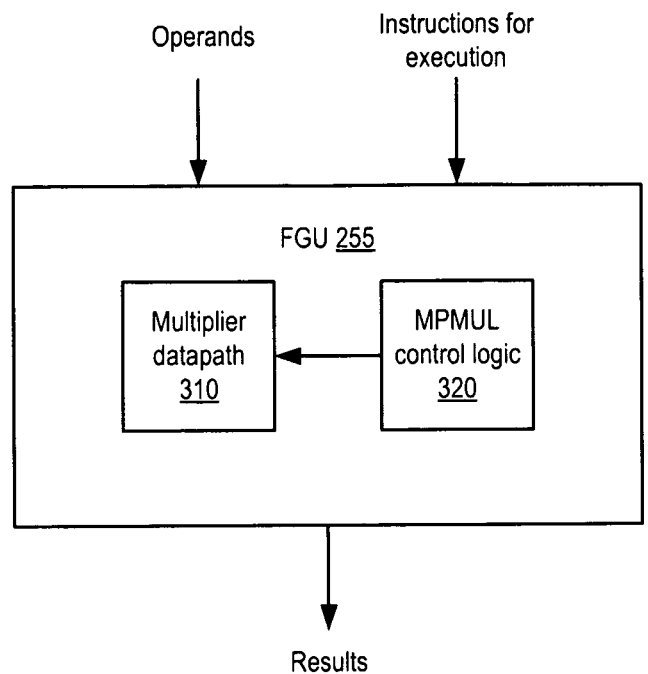
FIG. 3 is a block diagram illustrating one embodiment of a floating-point graphics unit that is configured to implement support for large-operand multiplication.

FIG. 3 illustrates one example of an embodiment of FGU 255 that may be configured to implement single-instruction support for large-operand multiplication. In the illustrated embodiment, FGU 255 includes multiplier datapath 310 as well as multiple-precision multiply (MPMUL) control logic 320. FGU 255 may also be referred to as an instruction execution unit, and may be configured to receive instructions for execution directly or indirectly from IFU 200, for example from issue unit 230. It is noted that although in various embodiments FGU 255 may include additional circuits configured to perform floating-point, graphics, and/or cryptographic operations, other embodiments of an instruction execution unit that includes multiplier datapath 310 and MPMUL control logic 320 may implement only some or none of these other features, or additional features not described above. Also, it is noted that in some embodiments, multiplier datapath 310 and MPMUL control logic 320 may reside in different functional units. For example, MPMUL control logic 320 may reside in a unit other than FGU 255.

Broadly speaking, in various embodiments, multiplier datapath 310 may include a variety of logic elements configured to produce a multiplicative result from input data operands. For example, as discussed in greater detail below, multiplier datapath 310 may include logic elements configured to generate partial products from multiplicand and multiplier operands (e.g., according to a Booth recoding technique, or another suitable technique) as well as logic elements configured to accumulate the generated partial products into a resultant product (e.g., through the use of a Wallace tree or another type of adder/accumulator architecture).

In various embodiments, MPMUL control logic 320 may include state machines, microcode, or other control structures configured to coordinate the operation of multiplier datapath 310 during large-operand multiplications. For example, MPMUL control logic 320 may be configured to coordinate the sequencing of successive multiplication operations, the retrieval of operands from other sources within core 100 (e.g., register files), and the storage of results within architecturally-visible state.

Prior to exploring particular embodiments of multiplier datapath 310 and MPMUL control logic 320, it is helpful to examine the dataflow characteristics of large-operand multiplications. As an example, consider the multiplication of two 512-bit operands A and B, where each operand includes 8 64-bit "words" denoted A7 through A0 and B7 through B0, and where 7 and 0 denote the most and least significant words, respectively. Generally speaking, the term "word" is used herein to denote the largest input operand multiplier datapath 310 is capable of receiving during its operation. That is, an instance of multiplier datapath 310 having a word size of M bits is capable of multiplying operands having at most a maximum number of bits M. For example, if multiplier datapath 310 is configured to implement multiplication of 64-bit operands, then a word corresponds to a 64-bit quantity.

Given operands A and B, arranged as follows:

| A7 | A6 | A5 | A4 | A3 | A2 | A1 | A0 |
|----|----|----|----|----|----|----|----|
| B7 | B6 | B5 | B4 | B3 | B2 | B1 | B0 | the ordinary generation of partial products would involve first multiplying B0 by each of A0 through A7, then multiplying B1 by each of A0 through A7, and so forth, offsetting each partial product by one word position, to yield 8 partial products:

|      |      |      |      |      |      |      |      |      |      |      |      |      |      |
|------|------|------|------|------|------|------|------|------|------|------|------|------|------|
|      |      |      |      |      |      | A7B0 | A6B0 | A5B0 | A4B0 | A3B0 | A2B0 | A1B0 | A0B0 |
|      |      |      |      |      | A7B1 | A6B1 | A5B1 | A4B1 | A3B1 | A2B1 | A1B1 | A0B1 |      |
|      |      |      |      | A7B2 | A6B2 | A5B2 | A4B2 | A3B2 | A2B2 | A1B2 | A0B2 |      |      |
|      |      |      | A7B3 | A6B3 | A5B3 | A4B3 | A3B3 | A2B3 | A1B3 | A0B3 |      |      |      |
|      |      | A7B4 | A6B4 | A5B4 | A4B4 | A3B4 | A2B4 | A1B4 | A0B4 |      |      |      |      |
|      | A7B5 | A6B5 | A5B5 | A4B5 | A3B5 | A2B5 | A1B5 | A0B5 |      |      |      |      |      |

| | | | | | | | |
|---|---|---|---|---|---|---|---|
| A7B6 | A6B6 | A5B6 | A4B6 | A3B6 | A2B6 | A1B6 | A0B6 |
| A7B7 | A6B7 | A5B7 | A4B7 | A3B7 | A2B7 | A1B7 | A0B7 |

Summing these partial products (appropriately accumulating the carry out of each less-significant column into the next more-significant column) then yields the 1024-bit product of A and B. It is noted that in this diagram, each column corresponds to one word of the result, while each product term may be two words wide. Thus, to sum these partial products as shown, it may be necessary to output the lower word of each summed column as a word of the result, and to carry the remaining bits of each column into the next column, as described -in greater detail below. In other words, for visual clarity, this diagram does not attempt to depict the "overlap" of the carried bits from one column into the next, although it is understood that this overlap exists.

In a full-precision hardware multiplier, most or all partial products might be generated concurrently, and then the resultant array of partial products would be accumulated in parallel to generate the resultant product. However, by definition, a large-operand multiplication exceeds the full precision of the available hardware multiplier. Thus, adopting a similar approach as the full-precision multiplier, in which partial products are fully generated and then accumulated, may result in a considerable amount of data movement.

A more efficient implementation for large-operand multiplication may result from a column-oriented accumulation technique. Assume, for example, that the available hardware multiplier supports multiplication of 64-bit operands to produce a 128-bit product. Starting with the rightmost value in the partial product array shown above, the least significant 64 bits of the large-operand product may be determined from the lower 64 bits of the 128-bit product A0B0. The next 64 bits of the large-operand product may be determined from the lower 64 bits of the sum of the 128-bit products A1B0 and A0B1, summed with the upper 64 bits that effectively "carried out" of product A0B0.

This process may generally proceed in a columnar fashion, where word k of the resultant product may be determined from the sum of the products AiBj, where i+j=k, plus the most significant bits carried out of column k-1. In this approach, the large-operand product may be determined from least-significant word to most-significant word, where any given column k depends only on column k-1.

Large-Operand Multiplier Datapath

Figure 4:
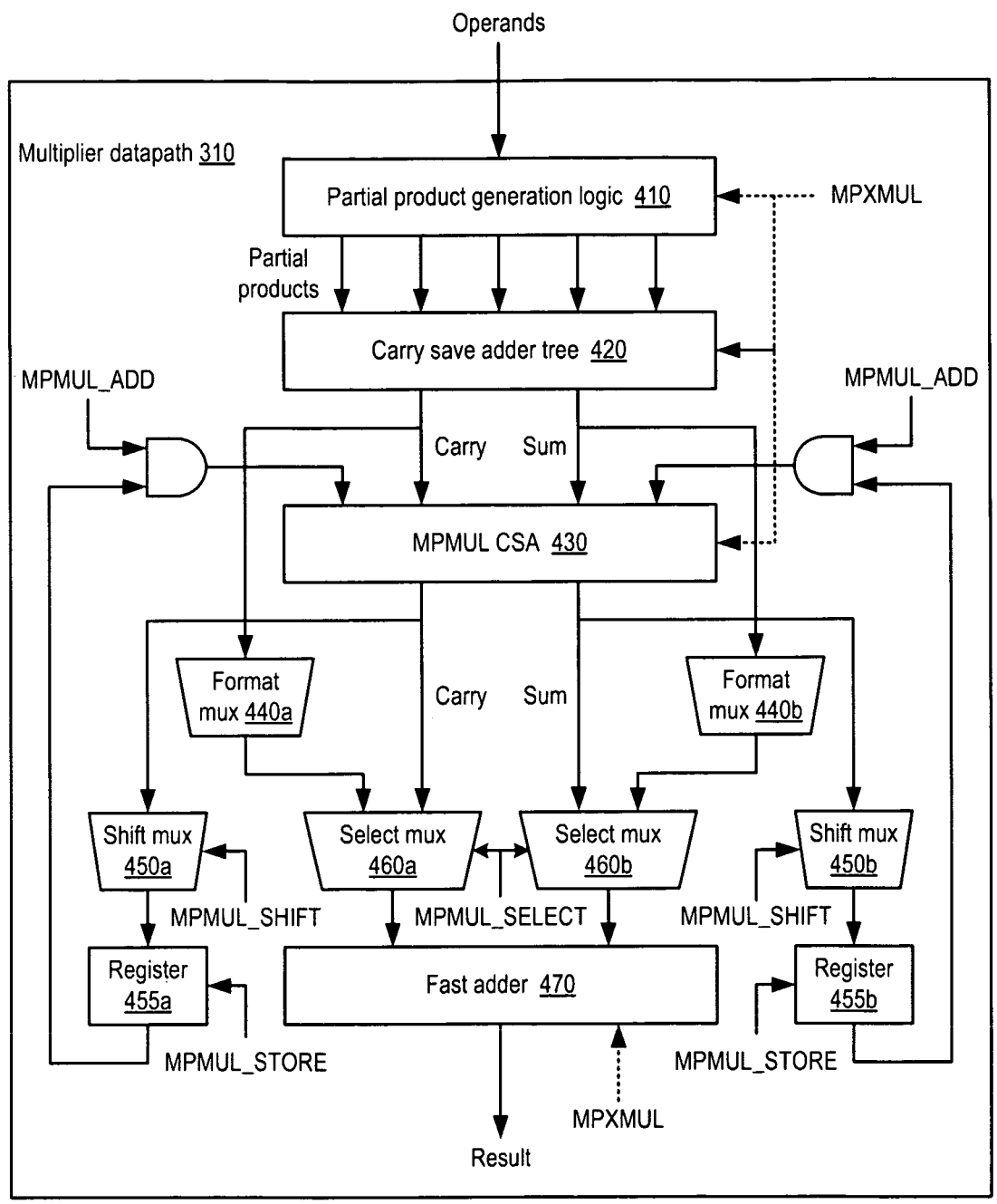
FIG. 4 is a block diagram of one embodiment of a multiplier datapath configured to support ordinary full-precision multiplication as well as large-operand multiplication.

FIG. 4 illustrates one example of multiplier datapath 310 that may be configured to support ordinary, full-precision multiplication as well as large-operand multiplication for operand cases that exceed the width of the datapath. In the illustrated embodiment, multiplier datapath 310 includes partial product generation logic 410 coupled to a tree of carry save adders (CSAs) 420. The outputs of CSAs 420 are coupled to the inputs of MPMUL CSA 430, as well as a pair of format multiplexers (or muxes) 440a-b. The outputs of MPMUL CSA 430 are coupled to a pair of shift muxes 450a-b as well as a pair of select muxes 460a-b. The outputs of shift muxes 450a-b are stored in a pair of registers 455a-b, while select muxes 460a-b are coupled to a fast adder 470. The illustrated embodiment depicts only one possible configuration of multiplier datapath 310, and other embodiments that include other or different arrangements of elements are possible and contemplated.

It is noted that timing elements, such as latches or pipeline registers, are not specifically shown in FIG. 4, but may be included in various embodiments of multiplier datapath 310. The placement of timing elements relative to other datapath structures may vary depending on factors such as the targeted operating frequency of the processor, the electrical characteristics of the process technology used to construct the physical circuits, testability concerns, and/or other design considerations. In addition to the features described below, numerous examples of particular circuits and logic configurations that may be employed within or in connection with various embodiments of multiplier datapath 310 may be found in U.S. Patent Application Publication No. 2004/0267855, naming Shantz et al. as inventors, filed on Feb. 27, 2004, and published on Dec. 30, 2004, which is hereby incorporated by reference in its entirety. However, to the extent that there exists any conflict between the incorporated application and this specification, it is intended that this specification control.

Partial product generation logic 410 may generally be configured to generate partial products from the multiplier and multiplicand operands according to any suitable technique. For example, a given partial product that corresponds to a particular bit of the multiplier operand may be generated by shifting the multiplicand left so that the LSB of the shifted multiplicand aligns with the particular bit of the multiplier, and multiplying the shifted multiplicand by the value of the particular bit of the multiplier (e.g., 0 or 1). In other embodiments, partial product generation logic 410 may implement a radix-4 Booth encoding that may reduce the total number of partial products required to be generated for a given multiplication.

CSAs 420 may be configured to accumulate the partial products generated by partial product generation logic 410. Generally speaking, an N:M CSA is an adder circuit that is configured to receive N input bits, count them, and output the result as an M-bit value. For example, a 4:2 CSA may be configured to receive 4 input bits and to produce a 2-bit output value as well as a carry out to the next most significant bit position. In some embodiments, CSAs 420 may be configured as a Wallace tree, although any suitable configuration of CSAs 420 may be employed. Also, in some embodiments, CSAs 420 may be configured to accumulate a third operand (not shown) in addition to the generated partial products. For example, in embodiments that support multiply-accumulate operation, two input operands may correspond to the multiplier and multiplicand, while the third operand may correspond to the value to be accumulated with the product of the first two.

In many embodiments, CSAs 420 may be configured to reduce the several partial products to a pair of values that, when added together in an adder such as fast adder 470, yield the final multiplicative product. This pair of values may also be referred to as a sum-and-carry representation. In various embodiments, fast adder 470 may be implemented according to any suitable organization, such as a carry lookahead adder (CLA), for example.

It is noted that in some embodiments, multiplier datapath 310 may be configured to perform multiplication over binary fields (e.g., Galois field multiplication) in addition to multiplication over ordinary integer fields. In a binary field mode of operation, addition of two operands may be performed by a bitwise exclusive-OR (XOR) operation between the operands (i.e., without carrying any values across bit positions). Binary field multiplication may be performed in a manner similar to integer multiplication, except that during binary field multiplication, partial products may be accumulated using bitwise XOR operations (i.e., without carrying any values across columns of bits). Thus, in some embodiments, CSAs 420 may be configured to support a binary field mode of partial product accumulation, during which carries out of a given bit position within CSAs 420 are suppressed. Other elements of multiplier datapath 310, such as, e.g., fast adder 470, may be similarly configured to perform field arithmetic rather than integer arithmetic during a binary field mode of operation, for example by suppressing carries between adjacent bits within fast adder 470. The optional MPXMUL control signal is shown as an input to partial product generation logic 410, CSAs 420, MPMUL CSA 430, and fast adder 470, such that when this signal is asserted, the controlled elements perform binary field operations rather than integer field operations. However, it is noted that binary field capability may be omitted from embodiments of multiplier datapath 310.

In the illustrated embodiment, processing of the output of CSAs 420 prior to the operation of fast adder 470 depends upon the status of several control inputs, which in turn depend upon whether the multiplication being performed is an ordinary multiplication or a large-operand multiplication. As shown, select muxes 460*a-b* are controlled by the MPMUL_SELECT signal, which may be provided by control logic such as MPMUL control logic 320. During ordinary multiplication, the MPMUL_SELECT signal may be deasserted, and select muxes 460*a-b* may be configured to select the sum and carry values produced by format muxes 440*a-b*, thus bypassing MPMUL CSA 430. In various embodiments, format muxes 440*a-b* may be configured to perform any necessary formatting (e.g., shifting, value substitution) that may be required during the course of ordinary multiplication.

As noted above, large-operand multiplication may be implemented in a column-by-column fashion, where each portion of the computed final product is dependent in part on the uppermost bits of the immediately less significant portion of the final product. In the illustrated embodiment, this procedure may be implemented as follows. During large-operand multiplication, the MPMUL_SELECT signal may be asserted, resulting in the selection of the output of MPMUL CSA 430. Additionally, during large-operand multiplication, the values of registers 455*a-b* store the uppermost bits of the immediately prior product. As indicated in FIG. 4, these values (qualified by the MPMUL_ADD signal) may be added within MPMUL CSA 430 along with the output of CSAs 420. Thus, during large-operand multiplication, this embodiment of multiplier datapath 310 may be configured to produce, at the output of select muxes 460*a-b*, a sum-and-carry representation of a summation of both the outputs of CSAs 420 and the values stored in registers 455*a-b*.

During large-operand multiplication, the output of MPMUL CSA 430 may additionally be right-shifted by the amount necessary to align the most significant bits of the product currently being computed with the least significant bits of the product to be computed during the next iteration of large-operand multiplication. In the illustrated embodiment, this shifting may be performed by shift muxes 450*a-b* under control of the MPMUL_SHIFT signal, and may be stored within register 455*a-b* under control of the MPMUL_STORE signal. In some embodiments, shifting may occur only when the final accumulated product for a given column of the large-operand multiplication has been determined. During earlier stages of accumulation within the given column, registers 455*a-b* may operate to accumulate an intermediate value without shifting.

For example, consider the previously-discussed case of multiplying two 512-bit operands A and B (each consisting of 8 64-bit words) within an embodiment of multiplier datapath 310 that is configured to perform multiplication of 64-bit operands. As noted above, initially, words A0 and B0 may be multiplied to determine a 128-bit result. The least significant 64 bits of this result may correspond to the least significant 64 bits of the final 1024-bit product, while the remaining bits of the product of A0 and B0 may be accumulated within the next columnar addition. Thus, in the illustrated embodiment, the product A0B0 may be right-shifted by 64 bits and stored within registers 455*a-b*.

To accumulate the next column, the product A1B0 (or alternatively, A0B1) may then be determined and, via MPMUL CSA 430, added to the shifted portion previously stored within registers 455*a-b*. The result may then be stored within registers 455*a-b* without shifting. Then, the product A0B1 (or alternatively, A1B0) may be determined and, via MPMUL CSA 430, added to the earlier result. Because this represents the final accumulated product for the current column, the least significant 64 bits correspond to bits 127:64 of the final 1024-bit product, while the most significant bits are to be shifted and added to the next column. Accordingly, the result may be right-shifted by 64 bits and stored within registers 455*a-b*. Operation may continue in a similar fashion until all columns of the large-operand multiplication have been processed.

It is noted that when multiple N-bit values are accumulated within a column of a large-operand multiplication, a representation of the accumulated value may require more than N bits. For example, adding four 128-bit numbers may yield a 130-bit result. Accordingly, in some embodiments, relevant elements of multiplier datapath 310 (e.g., registers 455*a-b*, MPMUL CSA 430) may be implemented to accommodate the largest accumulated value that is anticipated during large-operand multiplication.

As shown in the illustrated embodiment, shift muxes 450*a-b* and registers 455*a-b* are configured to operate on values represented in sum-and-carry form, as produced by CSAs 420 and MPMUL CSA 430. In other embodiments, it is contemplated that a single shift mux and accumulator register may be employed following fast adder 470, such that shifting and accumulation is performed on the final two's complement or other representation produced by fast adder 470 rather than the sum-and-carry representation.

Control of Large-Operand Multiplication

When properly sequenced, the embodiments of multiplier datapath 310 described above may be configured to perform large-operand multiplication as a sequence of multiplications and accumulations. In various embodiments, MPMUL control logic 320 may be configured to provide the proper sequence of operands and control signals to multiplier datapath 310 such that an entire large-operand multiplication may be performed in response to execution of a single instruction issued by issue unit 230. For example, MPMUL control logic 320 may include state machines, microcode, or other suitable sequencing circuits that may be configured to autonomously perform a large-operand multiplication in response to a large-operand multiplication instruction without further control or involvement by other programmer-visible instructions.

Figure 5:
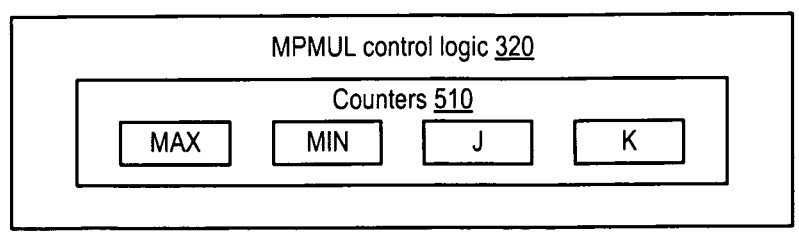
FIG. 5 is a block diagram of one embodiment of multiplier control unit.

In various embodiments, MPMUL control logic 320 may implement a number of counter registers configured to track the progress of a large-operand multiplication, as well as logic that is configured to carry out certain operations dependent upon the state of the large-operand multiplication as reflected by the counter registers. FIG. 5 illustrates one example of such an embodiment of MPMUL control logic

320. In the illustrated embodiment, MPMUL control logic 320 includes a set of counters 510 that includes four counters, denoted MAX, MIN, J, and K. As described in greater detail below, counters J and K may track specific words of the large operands currently being multiplied, while MAX and MIN together may track the column of the large-operand multiplication currently being performed. In different embodiments, the width of counters 510 may vary depending on the maximum operand size supported for a large-operand multiplication operation. For example, if core 100 supports multiplication of 2048-bit operands and implements a multiplier datapath 310 capable of performing 64-bit multiplications, each of the large operands may be divided into 32 64-bit words. In such a case, counters J and K may be implemented as 5-bit counters (i.e., sufficient to distinguish the 32 input words).

Figure 6:
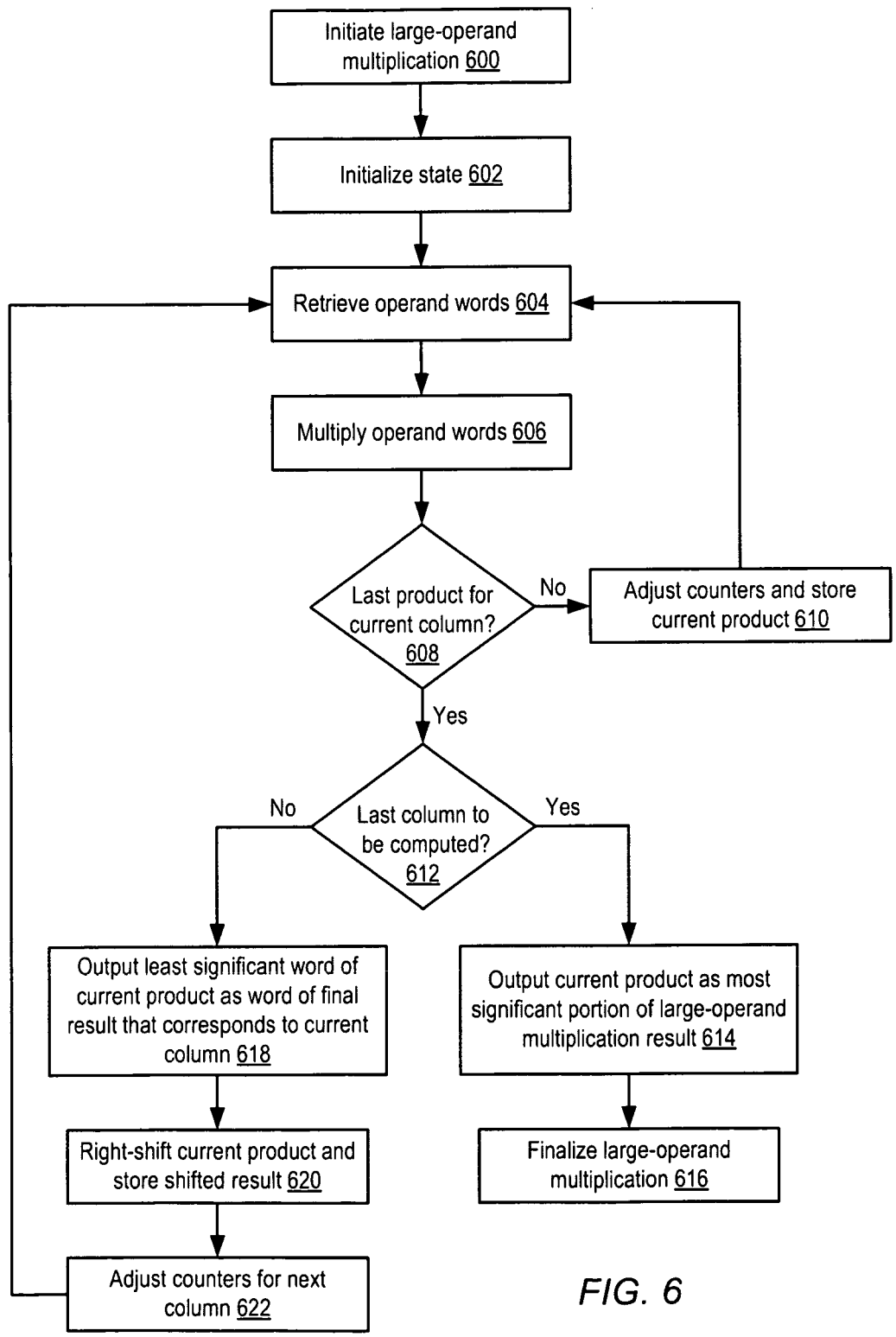
FIG. 6 is a flow diagram describing the operation of one embodiment of multiplier control logic during a large-operand multiplication.

FIG. 6 illustrates one possible method of operation of MPMUL control logic 320 during the course of a large-operand multiplication. In the illustrated embodiment, operation begins in block 600 where a large-operand multiplication to multiply one large operand A by another large operand B is initiated. For example, as described in greater detail below in conjunction with the descriptions of FIGS. 7-8, in some embodiments, MPMUL control logic 320 may be configured to initiate and perform a large-operand multiplication in response to the issuance for execution of a single, programmer-visible instruction defined within an ISA of core 100.

In response to initiation of a large-operand multiplication, state initialization may occur (block 602). In various embodiments, upon commencing a large-operand multiplication, MPMUL control logic 320 may be configured to set or reset state elements such as counters 510, state machines, and/or other elements to known initial values. For example, MPMUL control logic 320 may be configured to initialize each of the MAX, MIN, J, and K counters 510 to zero. In some embodiments, MPMUL control logic 320 may also be configured to initialize state elements within multiplier datapath 310. For example, registers 455*a-b* may be initialized to zero at the beginning of a large-operand multiplication.

Operand words are then retrieved (block 604) and multiplied (block 606). For example, counters J and K may respectively denote the words of operand A and B to be retrieved and multiplied together; thus, if J=0 and K=1, then the words A[0] and B[1] may be retrieved. In some embodiments, MPMUL control logic 320 may be configured to coordinate the retrieval of the words, as they are needed, from architecturally visible storage (e.g., registers in an integer register file and/or a floating-point register file that can be read and written by software). In other embodiments, some or all of the words may be copied into non-architecturally-visible storage (e.g., a private register file local to FGU 255) during initialization. To perform the multiplication, MPMUL control logic 320 may be configured to control the various control inputs of multiplier datapath 310. For example, MPMUL control logic 320 may cause the MPMUL_ADD signal to enable addition of the accumulated values in registers 455*a-b*, and may cause the MPMUL_SELECT signal to select a result from MPMUL CSA 430, each at the appropriate time during datapath operation.

As noted above, the process of performing large-operand multiplication may be understood as a process of generating and summing products in a column-oriented fashion, and then repeating this process across the columns of words in the result of the large-operand multiplication. Correspondingly, when a product of words has been determined, it may then be determined whether this product was the last product to be computed for the current column (block 608). In some embodiments, MPMUL control logic 320 may be configured to determine this condition by ascertaining whether the values of counter A and counter MAX are equal (or, equivalently, whether B and MIN are equal). If so, then the last product for the current column has been computed.

If the currently produced product is not the last to be computed for the current column, the counters may be adjusted to reflect the next words of A and B to be retrieved, and the currently produced product may be stored within registers 455*a-b* (block 610). Operation may then continue from block 604. In some embodiments, adjusting the counters for the next product may include incrementing A and decrementing B.

If the currently produced product is the last to be computed for the current column, then it may be determined whether the current column is the last column to be computed (block 612). In some embodiments, MPMUL control logic 320 may be configured to determine this condition by ascertaining whether counters MIN and MAX are equal. If so, then the last column has been computed. In this case, the currently produced product may be output as the most significant portion of the large-operand multiplication result (block 614). In some embodiments, the most significant portion of the result may be output over several cycles. For example, in some implementations, multiplier datapath 310 may be configured to output only one word of a product, even though the product may be larger than one word (e.g., when 64-bit operands are multiplied, only 64 bits of the 128-bit result may be output from multiplier datapath 310). Thus, considering the 512-bit large operand multiplication example discussed above, in some embodiments, generation of the A7B7 product may produce the final 128 bits of the 1024-bit product over two cycles of operation. First, product bits 959:896 may be generated from the lower half of the A7B7 product, and then product bits 1023:960 may be generated from the upper half of the A7B7 product (which in some cases may be taken from the shifted bits stored within registers 455*a-b*, as described below with respect to block 620).

The large-operand multiplication may then be finalized as required by the particular implementation of core 100 (block 616). For example, in some embodiments, a commit process may be required to ensure that only nonspeculative results become architecturally visible. In some such embodiments, MPMUL control logic 320 may be configured to coordinate with other units of core 100 to ensure that the results are properly committed.

If the current column is not the last column to be computed, several actions may occur in preparation for computing the next column. The least significant word of the currently produced product may be output as the word of the final result that corresponds to the current column (block 618). In some embodiments, these output words may be stored within temporary storage that is not architecturally visible (e.g., a private register file within FGU 255) until the entire large-operand multiplication is complete, and the entire result can be committed to architecturally-visible state. In other embodiments, output words may be stored within architecturally visible state as they are produced, though other techniques may be employed to ensure that other instructions cannot utilize interim results until the entire large-operand multiplication is complete. For example, other instructions from the same thread as the large-operand multiplication may be prevented from issuing while the large-operand multiplication is executing, traps may be prevented from occurring within that thread until the large-operand multiplication is complete, and/or shadow registers may be employed to restore previous architectural state if a large-operand multiplication cannot complete after producing partial results.

The currently produced product may be right-shifted such that the least significant word is shifted out, and the shifted result may be stored within registers 455a-b (block 620). For example, in an embodiment where the word size is 64 bits, MPMUL control logic 620 may be configured to cause multiplier datapath 310 to shift the currently produced product by 64 bits and store the result, through appropriate manipulation of the MPMUL_SHIFT and MPMUL_STORE signals.

The counters may also be adjusted in preparation for computing the next column (block 622), and operation may continue from block 604. In some embodiments, adjustment of the counters may be performed dependent upon the size, in words, of the large-operand multiplication. For example, FGU 255 may be configured to perform large-operand multiplication operations using operands having a programmer-specified, variable size. In other embodiments, the operand size may be fixed.

In embodiments using counters such as those shown in FIG. 5, a parameter SIZE may be employed, where SIZE equals one less than the number of words in an operand of the large-operand multiplication (or the larger of the two operands, if they are of different sizes). Thus, for example, if 512-bit operands are being multiplied and the word size is 64 bits, then there may be 8 words in the operand, and SIZE may be set to 7. In some such embodiments, the counter adjustment of block 622 may include determining whether counter MAX equals SIZE. If MAX equals SIZE, then MAX is incremented and counter MIN is held constant. If MAX does not equal SIZE, then MAX is held constant and MIN is incremented. After either MAX or MIN has been incremented in this fashion, then counter A is initialized to MIN and counter B is initialized to MAX, and operation may continue from block 604.

It is noted that the sequence of operations illustrated in FIG. 6 is merely one example. In other embodiments, certain actions may be deleted or performed in a different order than that shown, and/or other actions may be performed in addition to those shown. Moreover, some embodiments of MPMUL control logic 320 may include different configurations of counters 510, or may use fixed state machines or techniques other than counters to control large-operand multiplication. Such variations are considered to be within the scope of the present disclosure.

The following table indicates one example of the application of the operations of FIG. 6 to the 512-bit large-operand multiplication that was previously discussed. Here, SIZE equals 7 (or 00111 in binary representation). The table indicates the binary values of the MAX, MIN, A, and B counters as operation progresses down and across the columns, as well as the specific product term that is produced at each iteration.

| Column # | MAX | MIN | A | B | Product |
|---|---|---|---|---|---|
| 0 | 00000 | 00000 | 00000 | 00000 | A0B0 |
| 1 | 00001 | 00000 | 00000 | 00001 | A0B1 |
|   |       |       | 00001 | 00000 | A1B0 |
| 2 | 00010 | 00000 | 00000 | 00010 | A0B2 |
|   |       |       | 00001 | 00001 | A1B1 |
|   |       |       | 00010 | 00000 | A2B0 |
| 3 | 00011 | 00000 | 00000 | 00011 | A0B3 |
|   |       |       | 00001 | 00010 | A1B2 |
|   |       |       | 00010 | 00001 | A2B1 |
|   |       |       | 00011 | 00000 | A3B0 |
| 4 | 00100 | 00000 | 00000 | 00100 | A0B4 |
|   |       |       | 00001 | 00011 | A1B3 |

-continued

| Column # | MAX | MIN | A | B | Product |
|---|---|---|---|---|---|
|   |       |       | 00010 | 00010 | A2B2 |
|   |       |       | 00011 | 00001 | A3B1 |
|   |       |       | 00100 | 00000 | A4B0 |
| 5 | 00101 | 00000 | 00000 | 00101 | A0B5 |
|   |       |       | 00001 | 00100 | A1B4 |
|   |       |       | 00010 | 00011 | A2B3 |
|   |       |       | 00011 | 00010 | A3B2 |
|   |       |       | 00100 | 00001 | A4B1 |
|   |       |       | 00101 | 00000 | A5B0 |
| 6 | 00110 | 00000 | 00000 | 00110 | A0B6 |
|   |       |       | 00001 | 00101 | A1B5 |
|   |       |       | 00010 | 00100 | A2B4 |
|   |       |       | 00011 | 00011 | A3B3 |
|   |       |       | 00100 | 00010 | A4B2 |
|   |       |       | 00101 | 00001 | A5B1 |
|   |       |       | 00110 | 00000 | A6B0 |
| 7 | 00111 | 00000 | 00000 | 00111 | A0B7 |
|   |       |       | 00001 | 00110 | A1B6 |
|   |       |       | 00010 | 00101 | A2B5 |
|   |       |       | 00011 | 00100 | A3B4 |
|   |       |       | 00100 | 00011 | A4B3 |
|   |       |       | 00101 | 00010 | A5B2 |
|   |       |       | 00110 | 00001 | A6B1 |
|   |       |       | 00111 | 00000 | A7B0 |
| 8 | 00111 | 00001 | 00001 | 00111 | A1B7 |
|   |       |       | 00010 | 00110 | A2B6 |
|   |       |       | 00011 | 00101 | A3B5 |
|   |       |       | 00100 | 00100 | A4B4 |
|   |       |       | 00101 | 00011 | A5B3 |
|   |       |       | 00110 | 00010 | A6B2 |
|   |       |       | 00111 | 00001 | A7B1 |
| 9 | 00111 | 00010 | 00010 | 00111 | A2B7 |
|   |       |       | 00011 | 00110 | A3B6 |
|   |       |       | 00100 | 00101 | A4B5 |
|   |       |       | 00101 | 00100 | A5B4 |
|   |       |       | 00110 | 00011 | A6B3 |
|   |       |       | 00111 | 00010 | A7B2 |
| 10 | 00111 | 00011 | 00011 | 00111 | A3B7 |
|   |       |       | 00100 | 00110 | A4B6 |
|   |       |       | 00101 | 00101 | A5B5 |
|   |       |       | 00110 | 00100 | A6B4 |
|   |       |       | 00111 | 00011 | A7B3 |
| 11 | 00111 | 00100 | 00100 | 00111 | A4B7 |
|   |       |       | 00101 | 00110 | A5B6 |
|   |       |       | 00110 | 00101 | A6B5 |
|   |       |       | 00111 | 00100 | A7B4 |
| 12 | 00111 | 00101 | 00101 | 00111 | A5B7 |
|   |       |       | 00110 | 00110 | A6B6 |
|   |       |       | 00111 | 00101 | A7B5 |
| 13 | 00111 | 00110 | 00110 | 00111 | A6B7 |
|   |       |       | 00111 | 00110 | A7B6 |
| 14 | 00111 | 00111 | 00111 | 00111 | A7B7 |

Instruction Support for Large-Operand Multiplication

As noted above, in one embodiment, FGU 255 may be configured to provide support for a large-operand multiplication instruction, such that execution of a single instance of the large-operand multiplication instruction results in FGU 255 performing an entire large-operand multiplication to completely determine the result of the large-operand multiplication instruction. That is, rather than using a number of discrete general-purpose or special-purpose instructions defined within the processor's ISA to perform the large-operand multiplication, a programmer may specify a single instance of a large-operand multiplication instruction, such that execution of this instruction determines all bits of the large-operand multiplication result, without requiring execution of any other programmer-selected instruction within the ISA. (It is noted that as used herein, "programmer" may refer to either a human programmer who manually specifies a sequence of instructions, for example by creating an assembly language program, or a machine-implemented entity configured to generate executable code sequences, such as a compiler for a high-level programming language.)

Figure 7:
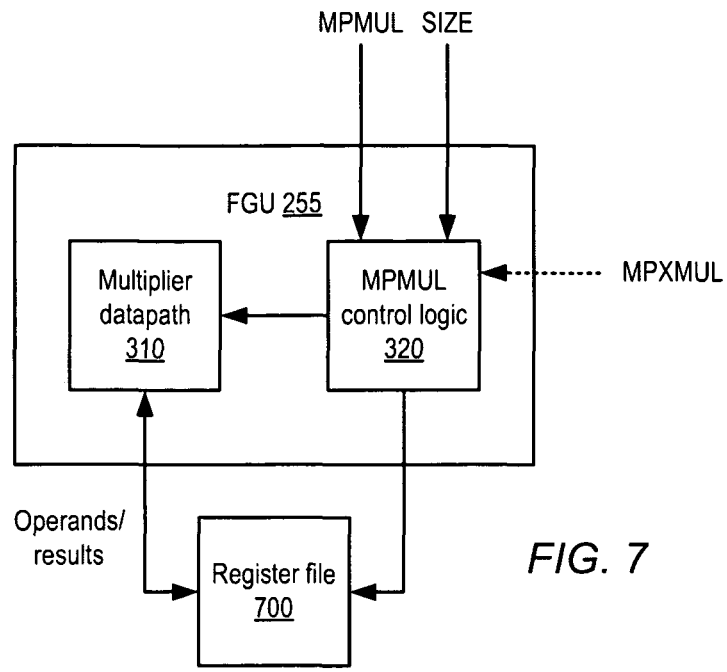
FIG. 7 is a block diagram illustrating one embodiment of a floating-point graphics unit that is configured to implement support for a large-operand multiplication instruction.

One such embodiment of FGU 255 is shown in FIG. 7. In the illustrated embodiment, FGU 255 includes multiplier datapath 310 and MPMUL control logic 320, which may be configured as described above with respect to FIGS. 3-6. Additionally, multiplier datapath 310 is shown communicatively coupled to receive operands from a register file 700 under the control of MPMUL control logic 320.

In the illustrated embodiment, MPMUL control logic 320 may be configured to receive for execution a large-operand multiplication instruction defined within the processor's ISA. This instruction is denoted with the instruction mnemonic MPMUL (though any suitable mnemonic may be employed). In various embodiments, MPMUL control logic 320 may directly decode this instruction from opcode bits sent from upstream pipeline stages, such as from issue unit 230, or may receive already-decoded or partially-decoded signals indicative of the occurrence of any of these instructions. Also, in the illustrated embodiment, the MPMUL instruction may support a programmable SIZE parameter, such that large-operand multiplications of varying sizes may be performed. The SIZE parameter is illustrated as an additional input to MPMUL control logic 320, although in various embodiments, it may be either directly decoded from the MPMUL instruction by MPMUL control logic 320, or received as a decoded field from upstream pipeline stages.

As noted above, in some embodiments, multiplier datapath 310 may also be configured to perform multiplication over a binary field in addition to integer multiplication. Correspondingly, in some embodiments, MPMUL control logic 320 may also be configured to receive a large-operand binary field multiplication instruction, which may be denoted with the instruction mnemonic MPXMUL. Upon execution, the MPXMUL instruction may behave in the same fashion as the MPMUL instruction described herein, except that as noted above, carries across bit positions within the CSAs and fast adder of multiplier datapath 310 may not occur in binary field multiplication. Support for this instruction is optional.

In the illustrated embodiment, the operands to be multiplied may be received from register file 700, and the result of the large-operand multiplication may be stored to register file 700. In various embodiments, register file 700 may correspond to an architecturally-visible integer register file, an architecturally-visible floating-point register file, portions of both of these types of register file, or an alternatively addressed structure such as a set of memory-mapped registers, a defined set of memory locations, or a private (i.e., non-architecturally-visible) storage structure.

Figure 8:
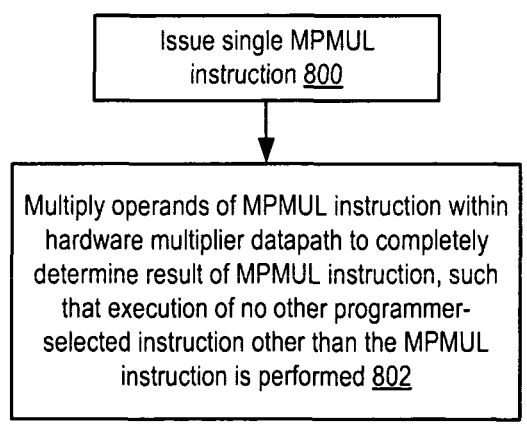
FIG. 8 is a flow diagram illustrating one embodiment of a method of operation of a processor configured to provide instruction-level support for a large-operand multiplication instruction.

FIG. 8 illustrates one embodiment of a method of operation of a processor configured to provide instruction-level support for the MPMUL large-operand multiplication instruction. Operation begins in block 800 where a single MPMUL instruction, defined within the processor's ISA, is issued to an instruction execution unit for execution. For example, a programmer may specify the MPMUL instruction within an executable thread of code such that the instruction is fetched by instruction fetch unit 200 of processor 10, and ultimately issued by issue unit 230 to FGU 255 for execution.

In response to receiving a single instance of the MPMUL instruction, the instruction execution unit multiplies the operands of the MPMUL instruction within a hardware multiplier datapath circuit to completely determine the result of the MPMUL instruction, such that to determine the result of the MPMUL instruction, the execution of no other programmer-selected instruction within the ISA other than the MPMUL instruction is performed (block 802). For example, upon receiving the MPMUL instruction, MPMUL control logic 320 may be configured to autonomously and iteratively perform the large-operand multiplication according to the method of operation shown in FIG. 6, or a similar method. Correspondingly, multiplier datapath 310 may produce all of the words of the result of the large-operand multiplication in response to execution of the MPMUL instruction.

As a result of executing the MPMUL instruction, production of all the words of the result may occur without the need for any other programmer-selected instruction to be fetched by IFU 200 or executed. That is, in embodiments, the MPMUL instruction may behave from an architectural perspective (e.g., the perspective of a programmer of core 100) as a single instruction producing a single associated result, where the result occupies multiple architecturally-defined registers, and where the result may be obtained over multiple execution cycles.

In various embodiments, the MPMUL instruction may be implemented within any suitable ISA. For example, as noted previously, processor 10 may be configured to implement a version of the SPARC ISA, the x86 ISA, or the PowerPC® or MIPS® ISAs. Because large operands required by the MPMUL instruction may exceed the maximum width of a single operand under the implemented ISA, in some embodiments, the MPMUL operation may implicitly specify that its operands and result are to be stored in a defined set of architecturally-visible registers. For example, suppose that a hypothetical ISA defined a flat register file that included 128 individually addressable, 64-bit registers denoted R0 through R127, and suppose that within this hypothetical ISA, the MPMUL instruction is defined to operate on operands of at most 2048 bits in size. In some such instances, the MPMUL instruction may implicitly define registers R0 through R31 as the source of the first operand, registers R32 through R63 as the source of the second operand, and registers R64 through R127 as the destination for the 4096-bit result. Thus, prior to executing the MPMUL instruction, other instructions may need to ensure that the operands have been properly stored within registers R0 through R63.

Figure 9:
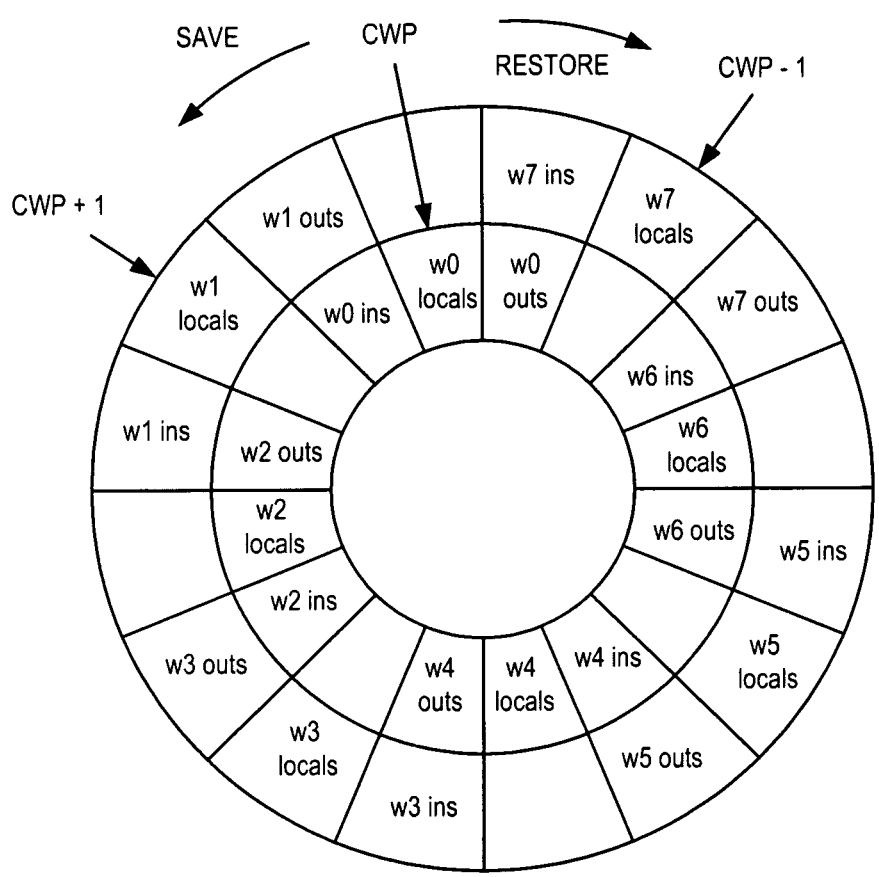
FIG. 9 is a block diagram illustrating one embodiment of a set of register windows.

Rather than a flat integer register file in which all architectural registers are concurrently visible to software, embodiments of the SPARC ISA may employ a set of "register windows." In one such embodiment, at any given time, software may have access to 32 integer registers: 8 global registers, and 24 registers defined within the current register window. Of the latter, 8 registers may be denoted input registers, 8 may be denoted local registers, and 8 may be denoted output registers. Moreover, if the current register window is denoted with a number CWP, the output registers of window CWP are identical to the input registers of window CWP−1, and the input registers of window CWP are identical to the output registers of window CWP+1 (each of these being determined modulo the number of register windows implemented). FIG. 9 illustrates the relationship among register windows for an embodiment that includes 8 register windows, denoted w0 through w7. As shown in FIG. 9, execution of a SAVE or RESTORE instruction may cause CWP to be incremented or decremented, respectively. (In alternative embodiments, such as some processor embodiments prior to SPARC V9, CWP may instead be decremented on a SAVE and incremented on a RESTORE.) In some multithreaded embodiments of core 100 such as described above, one complete set of register windows (e.g., including the 8 windows shown in FIG. 9) may be provided for each thread, such that each thread has its own register state that is read and modified independent of the execution of other threads.

One possible example of a MPMUL instruction as it might be defined within a version of the SPARC ISA is as follows. In this example, the MPMUL instruction may take a 5-bit argument that defines the SIZE field discussed above. That is, the SIZE specified by the MPMUL instruction may denote the quantity N−1, where N is the number of 64-bit words in each operand to be multiplied. Thus, in this example, the MPMUL instruction may support up to 2048-bit operands, although in other embodiments, both the size and number of words supported by the MPMUL instruction may vary. It is noted that in some embodiments, a single MPMUL opcode may be employed, and the SIZE field may be encoded within the MPMUL instruction, e.g., as an immediate. In other embodiments, multiple distinct MPMUL opcodes may be defined, each of which implicitly encodes a single respective value of the SIZE field.

In some embodiments, the MPMUL instruction may be executed without regard to the privilege of the executing thread (e.g., it may be executed by user-level code), though in other embodiments, execution of the MPMUL instruction may be restricted to privileged code (e.g., code that executes in supervisor or hypervisor mode).

In this example, the MPMUL instruction makes use of seven integer register windows, as well as a number of floating point registers (which are not windowed in the described embodiment) to store operands and results. Let i denote the current window pointer CWP at the time the MPMUL instruction is executed, let multiplier[31:0] and multiplicand [31:0] respectively denote 2048-bit multiplier and multiplicand operands, each including 32 64-bit words, and let product [63:0] denote a 4096-bit product, including 64 64-bit words, where the highest numbered words are the most significant. Given these assumptions, the following represents one possible correspondence of the MPMUL operands and result to various integer and floating point registers:

| | |
|---|---|
| multiplier[7:0] : | cwp=i-6 {f2,f0,o5,o4,o3,o2,o1,o0}; |
| multiplier[15:8] : | cwp=i-6 {17,16,15,14,13,12,11,10}; |
| multiplier[23:16] : | cwp=i-6 {f6,f4,i5,i4,i3,i2,i1,i0}; |
| multiplier[31:24] : | {f22,f20,f18,f16,f14,f12,f10,f8} |
| multiplicand[7:0] : | cwp=i-5 {17,16,15,14,13,12,11,10}; |
| multiplicand[15:8] : | cwp=i-5 {f26,f24,o5,o4,o3,o2,o1,o0}; |
| multiplicand[23:16] : | {f42,f40,f38,f36,f34,f32,f30,f28}; |
| multiplicand[31:24] : | {f58,f56,f54,f52,f50,f48,f46,f44}; |
| product[7:0] : | cwp=i-4 {17,16,15,14,13,12,11,10}}; |
| product[13:8] : | cwp=i-4 {o5,o4,o3,o2,o1,o0}; |
| product[21:14] : | cwp=i-3 {17,16,15,14,13,12,11,10}; |
| product[27:22] : | cwp=i-3 {o5,o4,o3,o2,o1,o0}; |
| product[35:28] : | cwp=i-2 {17,16,15,14,13,12,11,10}; |
| product[41:36] : | cwp=i-2 {o5,o4,o3,o2,o1,o0}; |
| product[49:42] : | cwp=i-1 {17,16,15,14,13,12,11,10}; |
| product[55:50] : | cwp=i-1 {o5,o4,o3,o2,o1,o0}}; |
| product[63:56] : | cwp=i {17,16,15,14,13,12,11,10}; |

As shown here, one portion of an operand may be stored within an architecturally-visible integer register file, and a different portion of the same operand may be stored within an architecturally visible floating point register file. It is noted that any other mapping of MPMUL operands and result to any suitable combination of integer and floating point registers (including mappings involving only integer registers or only floating point registers) may be employed. Moreover, in some embodiments, different register mappings may be employed for different versions of the MPMUL instruction (e.g., for versions specifying different operand sizes).

Given the particular mapping of registers just detailed, the following code sequence demonstrates one example of how the MPMUL operands may be retrieved from memory and stored in the appropriate registers, and how the MPMUL result may be stored to memory after it has been computed. In the following sequence, it is noted that the SAVE and RESTORE instructions may be employed to adjust the current register window.

```
setx a_op, %g1, %g4        !# store address of a in %g4
setx b_op, %g1, %g5        !# store address of b in %g5
load_multiplier:
ldd [%g4 + 0x000], %f22    !# CWP = i-6
ldd [%g4 + 0x008], %f20
ldd [%g4 + 0x010], %f18
ldd [%g4 + 0x018], %f16
ldd [%g4 + 0x020], %f14
ldd [%g4 + 0x028], %f12
ldd [%g4 + 0x030], %f10
ldd [%g4 + 0x038], %f8
ldd [%g4 + 0x040], %f6
ldd [%g4 + 0x048], %f4
ldx [%g4 + 0x050], %i5
ldx [%g4 + 0x058], %i4
ldx [%g4 + 0x060], %i3
ldx [%g4 + 0x068], %i2
ldx [%g4 + 0x070], %i1
ldx [%g4 + 0x078], %i0
ldx [%g4 + 0x080], %l7
ldx [%g4 + 0x088], %l6
ldx [%g4 + 0x090], %l5
ldx [%g4 + 0x098], %l4
ldx [%g4 + 0x0a0], %l3
ldx [%g4 + 0x0a8], %l2
ldx [%g4 + 0x0b0], %l1
ldx [%g4 + 0x0b8], %l0
ldd [%g4 + 0x0c0], %f2
ldd [%g4 + 0x0c8], %f0
ldx [%g4 + 0x0d0], %o5
ldx [%g4 + 0x0d8], %o4
ldx [%g4 + 0x0e0], %o3
ldx [%g4 + 0x0e8], %o2
ldx [%g4 + 0x0f0], %o1
ldx [%g4 + 0x0f8], %o0
save                       !# CWP = i-5
load_multiplicand:
ldd [%g5 + 0x000], %f58
ldd [%g5 + 0x008], %f56
ldd [%g5 + 0x010], %f54
ldd [%g5 + 0x018], %f52
ldd [%g5 + 0x020], %f50
ldd [%g5 + 0x028], %f48
ldd [%g5 + 0x030], %f46
ldd [%g5 + 0x038], %f44
ldd [%g5 + 0x040], %f42
ldd [%g5 + 0x048], %f40
ldd [%g5 + 0x050], %f38
ldd [%g5 + 0x058], %f36
ldd [%g5 + 0x060], %f34
ldd [%g5 + 0x068], %f32
ldd [%g5 + 0x070], %f30
ldd [%g5 + 0x078], %f28
ldd [%g5 + 0x080], %f26
ldd [%g5 + 0x088], %f24
ldx [%g5 + 0x090], %o5
ldx [%g5 + 0x098], %o4
ldx [%g5 + 0x0a0], %o3
ldx [%g5 + 0x0a8], %o2
ldx [%g5 + 0x0b0], %o1
ldx [%g5 + 0x0b8], %o0
ldx [%g5 + 0x0c0], %l7
ldx [%g5 + 0x0c8], %l6
ldx [%g5 + 0x0d0], %l5
ldx [%g5 + 0x0d8], %l4
ldx [%g5 + 0x0e0], %l3
ldx [%g5 + 0x0e8], %l2
ldx [%g5 + 0x0f0], %l1
ldx [%g5 + 0x0f8], %l0
save                       !# CWP = i-4
save                       !# CWP = i-3
save                       !# CWP = i-2
save                       !# CWP = i-1
save                       !# CWP = i
run_mpmul:
```

-continued

```
mpmul 0x1f              !# CWP = i
store_result:
    setx vt_result, %g1, %g4   !# store address of result in %g4
    stx %l7, [%g4 + 0x000]     !# CWP = i
    stx %l6, [%g4 + 0x008]
    stx %l5, [%g4 + 0x010]
    stx %l4, [%g4 + 0x018]
    stx %l3, [%g4 + 0x020]
    stx %l2, [%g4 + 0x028]
    stx %l1, [%g4 + 0x030]
    stx %l0, [%g4 + 0x038]
    restore                    !# CWP = i−1
    stx %o5, [%g4 + 0x040]
    stx %o4, [%g4 + 0x048]
    stx %o3, [%g4 + 0x050]
    stx %o2, [%g4 + 0x058]
    stx %o1, [%g4 + 0x060]
    stx %o0, [%g4 + 0x068]
    stx %l7, [%g4 + 0x070]
    stx %l6, [%g4 + 0x078]
    stx %l5, [%g4 + 0x080]
    stx %l4, [%g4 + 0x088]
    stx %l3, [%g4 + 0x090]
    stx %l2, [%g4 + 0x098]
    stx %l1, [%g4 + 0x0a0]
    stx %l0, [%g4 + 0x0a8]
    restore                    !# CWP = i−2
    stx %o5, [%g4 + 0x0b0]
    stx %o4, [%g4 + 0x0b8]
    stx %o3, [%g4 + 0x0c0]
    stx %o2, [%g4 + 0x0c8]
    stx %o1, [%g4 + 0x0d0]
    stx %o0, [%g4 + 0x0d8]
    stx %l7, [%g4 + 0x0e0]
    stx %l6, [%g4 + 0x0e8]
    stx %l5, [%g4 + 0x0f0]
    stx %l4, [%g4 + 0x0f8]
    stx %l3, [%g4 + 0x100]
    stx %l2, [%g4 + 0x108]
    stx %l1, [%g4 + 0x110]
    stx %l0, [%g4 + 0x118]
    restore                    !# CWP = i−3
    stx %o5, [%g4 + 0x120]
    stx %o4, [%g4 + 0x128]
    stx %o3, [%g4 + 0x130]
    stx %o2, [%g4 + 0x138]
    stx %o1, [%g4 + 0x140]
    stx %o0, [%g4 + 0x148]
    stx %l7, [%g4 + 0x150]
    stx %l6, [%g4 + 0x158]
    stx %l5, [%g4 + 0x160]
    stx %l4, [%g4 + 0x168]
    stx %l3, [%g4 + 0x170]
    stx %l2, [%g4 + 0x178]
    stx %l2, [%g4 + 0x180]
    stx %l0, [%g4 + 0x188]
    restore                    !# CWP = i−4
    stx %o5, [%g4 + 0x190]
    stx %o4, [%g4 + 0x198]
    stx %o3, [%g4 + 0x1a0]
    stx %o2, [%g4 + 0x1a8]
    stx %o1, [%g4 + 0x1b0]
    stx %o0, [%g4 + 0x1b8]
    stx %l7, [%g4 + 0x1c0]
    stx %l6, [%g4 + 0x1c8]
    stx %l5, [%g4 + 0x1d0]
    stx %l4, [%g4 + 0x1d8]
    stx %l3, [%g4 + 0x1e0]
    stx %l2, [%g4 + 0x1e8]
    stx %l1, [%g4 + 0x1f0]
    stx %l0, [%g4 + 0x1f8]
    restore                    !# CWP = i−5
    restore                    !# CWP = i−6
```

It is noted that this code sequence represents merely one example of how one embodiment of the MPMUL instruction may be invoked. Numerous other embodiments and applications of the MPMUL instruction are possible and contemplated. For example, in other embodiments, different register mappings may be employed, or a dedicated register file that is distinct from existing integer and floating point register files may be used.

In some embodiments, the MPMUL instruction may have scheduling implications for the execution of other instructions. For example, in some implementations, the MPMUL instruction may be non-pipelined such that only one MPMUL instruction from any thread within core 100 may be executing at any given time. In such an implementation, the thread that issued the MPMUL instruction may be blocked from executing any further instructions until the MPMUL instruction completes, although other threads may continue execution. That is, the MPMUL instruction may be blocking with respect to the issuing thread, but non-blocking with respect to other threads.

Because multiplier hardware tends to require a significant amount of die area relative to other datapath elements, multiplier datapath 310 may also be used to execute multiplications other than large-operand multiplications. For example, it may be employed for integer multiplication and/or floating-point multiplication. Because MPMUL instructions may take a significant number of execution cycles to complete relative to other instructions, in some embodiments, an active MPMUL instruction may arbitrate with other instructions for access to multiplier datapath 310. If the MPMUL instruction loses arbitration, it may be temporarily interrupted while another instruction uses the datapath. For example, registers 455a-b (which may be actively written only during an MPMUL) may hold an intermediate value of the MPMUL instruction while the remainder of multiplier datapath 310 operates on an unrelated multiplication instruction.

Figure 10:
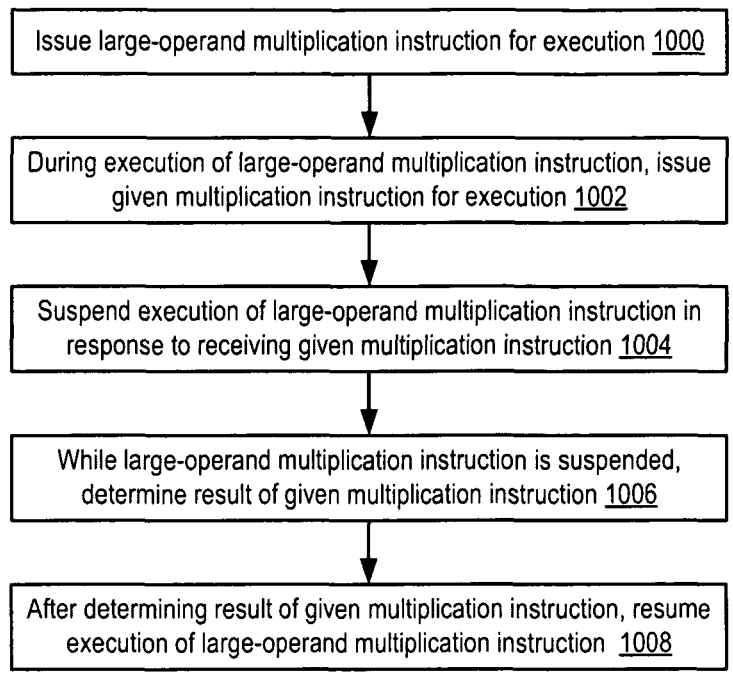
FIG. 10 is a flow diagram illustrating one embodiment of suspending and resuming execution of a large-operand multiplication instruction.

FIG. 10 illustrates one embodiment of a method of operation in which multiplier datapath 310 may be used for multiplication instructions other than the MPMUL instruction while the MPMUL instruction is executing. Operation begins in block 1000, where a large-operand multiplication instruction is issued for execution. Subsequently, a given multiplication instruction other than a large-operand multiplication instruction is issued for excution during execution of the large-operand multiplication instruction (block 1002). For example, an ordinary integer or floating-point multiplication instruction might be issued from a different thread than the MPMUL instruction.

In response to receiving the given multiplication instruction, execution of the large-operand multiplication instruction is suspended (block 1004). For example, in some embodiments, MPMUL control logic 320 may be configured to arbitrate for access to multiplier datapath 320 prior to each iteration of the MPMUL instruction. If MPMUL control logic 320 loses arbitration, execution of the MPMUL instruction may be suspended until MPMUL control logic 320 subsequently wins arbitration. In some embodiments, the intermediate state of the MPMUL instruction that is suspended may be stored within registers 455a-b until the MPMUL resumes.

While execution of the large-operand multiplication instruction is suspended, the result of the given multiplication instruction is determined (block 1006). For example, the integer or floating-point instruction may be allowed to execute within multiplier datapath 310.

After the result of the given multiplication instruction has been determined, execution of the large-operand multiplication instruction resumes (block 1008). For example, when MPMUL control logic 320 subsequently wins arbitration, it may retrieve operands and resume execution of the suspended MPMUL instruction. It is noted that in some embodiments, an MPMUL instruction may be suspended and resumed multiple times before it finally completes.

As noted previously, in some embodiments, the MPMUL instruction may commit intermediate results to architectural state as they are generated. For example, the various output registers identified above may be modified as result words are iteratively generated by multiplier datapath 310. In some such embodiments, the remainder of core 100 may guarantee that no pipeline flushes occur with respect to the executing thread until the MPMUL instruction finishes, in order to prevent architectural state from becoming inconsistent. In other embodiments, other suitable techniques may be employed to coordinate the writing of result data, taking into account the consistency requirements and implications of the particular implementation of core 100.

Example System Embodiment

Figure 11:
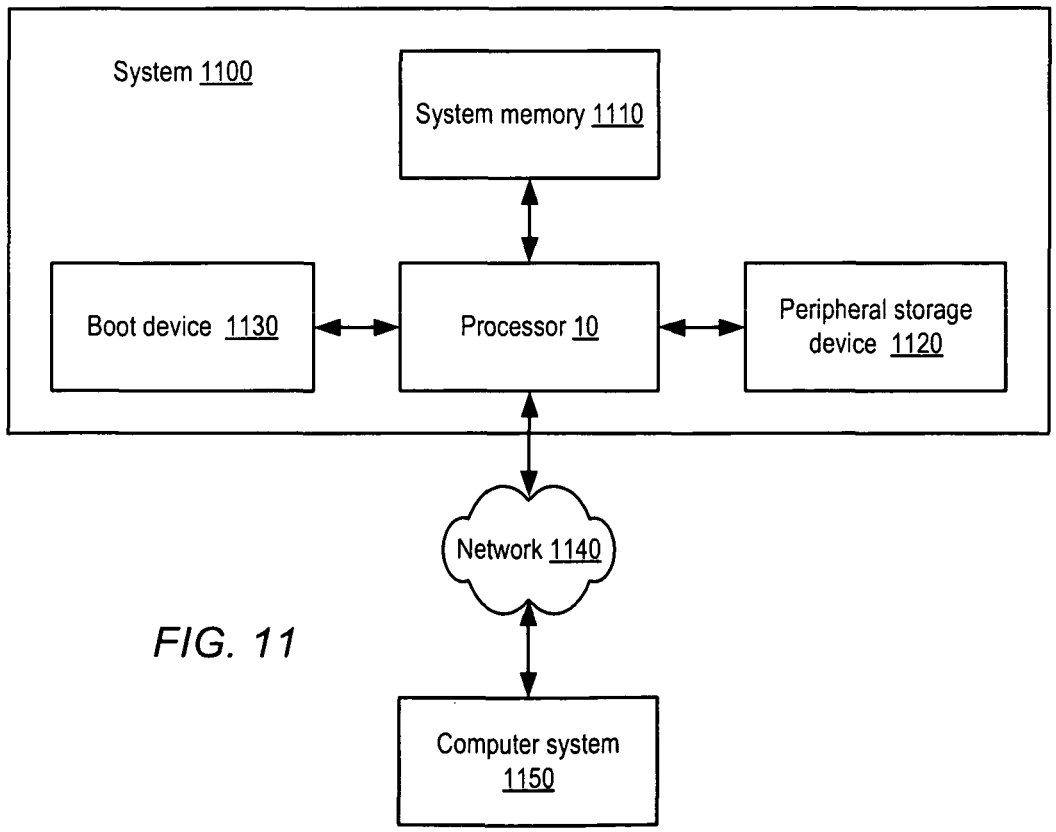
FIG. 11 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 11. In the illustrated embodiment, system 1100 includes an instance of processor 10, shown as processor 10a, that is coupled to a system memory 110, a peripheral storage device 1120 and a boot device 1130. System 1100 is coupled to a network 1140, which is in turn coupled to another computer system 1150. In some embodiments, system 1100 may include more than one instance of the devices shown. In various embodiments, system 1100 may be configured as a rack-mountable server system, as a standalone system, or in any other suitable form factor. In some embodiments, system 1100 may be configured as a client system rather than a server system.

In some embodiments, system 1100 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 140.

In various embodiments, system memory 1110 may comprise any suitable type of system memory as described above, such as FB-DIMM, DDR/DDR2/DDR3/DDR4 SDRAM, or RDRAM®, for example. System memory 1110 may include multiple discrete banks of memory controlled by discrete memory interfaces in embodiments of processor 10 that provide multiple memory interfaces 130. Also, in some embodiments, system memory 1110 may include multiple different types of memory.

Peripheral storage device 1120, in various embodiments, may include support for magnetic, optical, or solid-state storage media such as hard drives, optical disks, nonvolatile RAM devices, etc. In some embodiments, peripheral storage device 1120 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1120 may be coupled to processor 10 via peripheral interface(s) 150 of FIG. 1.

As described previously, in one embodiment boot device 1130 may include a device such as an FPGA or ASIC configured to coordinate initialization and boot of processor 10, such as from a power-on reset state. Additionally, in some embodiments boot device 1130 may include a secondary computer system configured to allow access to administrative functions such as debug or test modes of processor 10.

Network 1140 may include any suitable devices, media and/or protocol for interconnecting computer systems, such as wired or wireless Ethernet, for example. In various embodiments, network 1140 may include local area networks (LANs), wide area networks (WANs), telecommunication networks, or other suitable types of networks. In some embodiments, computer system 1150 may be similar to or identical in configuration to illustrated system 1100, whereas in other embodiments, computer system 1150 may be substantially differently configured. For example, computer system 1150 may be a server system, a processor-based client system, a stateless "thin" client system, a mobile device, etc. In some embodiments, processor 10 may be configured to communicate with network 1140 via network interface(s) 160 of FIG. 1.

It is noted that the above exemplary assembly language code sequences use the setx instruction. However, the setx instruction is defined within the SPARC ISA as a synthetic instruction. As described in section G.3 of the SPARC Architecture Manual Version 9, synthetic instructions may be provided in a SPARC assembler for the convenience of assembly language programmers, and they do generate instructions. The synthetic instructions map to actual instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
    an instruction fetch unit configured to issue instructions for execution, wherein the instructions are programmer-selectable from a defined instruction set architecture (ISA); and
    an instruction execution unit comprising a hardware multiplier datapath circuit, wherein the hardware multiplier datapath circuit is configured to multiply operands having a maximum number of bits M, and wherein the instruction execution unit is configured to receive instructions for execution from the instruction fetch unit;
    wherein in response to receiving a single instance of a large-operand multiplication instruction defined within the ISA, wherein at least one of the operands of the large-operand multiplication instruction includes more than the maximum number of bits M, the instruction execution unit is configured to multiply operands of the large-operand multiplication instruction within the hardware multiplier datapath circuit to determine a result of the large-operand multiplication instruction without execution of programmer-selected instructions within said ISA other than the large-operand multiplication instruction.

2. The processor as recited in claim 1, wherein to multiply the operands of the large-operand multiplication, the instruction execution unit is further configured to perform integer multiplication on the operands.

3. The processor as recited in claim 1, wherein to multiply the operands of the large-operand multiplication, the instruction execution unit is further configured to perform binary field multiplication on the operands.

4. The processor as recited in claim 1, wherein to determine the result of the large-operand multiplication instruction, the instruction execution unit is further configured to iteratively perform a number of M-bit multiplication operations within the hardware multiplier datapath circuit, wherein the number of M-bit multiplication operations performed is determined dependent upon an operand size of the large-operand multiplication instruction.

5. The processor as recited in claim 4, wherein the large-operand multiplication instruction specifies a variable, programmer-selectable size parameter indicative of the operand size of the large-operand multiplication instruction.

6. The processor as recited in claim 1, wherein the instruction fetch unit is further configured to issue instructions for execution that are selected from a plurality of threads, wherein in response to issuing the large-operand multiplication instruction from a given one of the threads, the instruction fetch unit is further configured to prevent additional instructions from issuing from the given thread until the large-operand multiplication instruction completes execution.

7. The processor as recited in claim 6, wherein while preventing additional instructions from issuing from the given thread, the instruction fetch unit is further configured to issue one or more instructions for execution that are selected from one or more threads other than the given thread.

8. The processor as recited in claim 7, wherein the one or more instructions include a given multiplication instruction other than the large-operand multiplication instruction, and wherein in response to receiving the given multiplication instruction during execution of the large-operand multiplication instruction, the instruction execution unit is further configured to:
suspend execution of the large-operand multiplication instruction;
determine a result of the given multiplication instruction; and
resume execution of the large-operand multiplication instruction.

9. The processor as recited in claim 1, wherein to multiply operands of the large-operand multiplication instruction within the hardware multiplier datapath circuit, the instruction execution unit is further configured to retrieve one portion of a given one of the operands from an architecturally-visible integer register file, and to retrieve a different portion of the given operand from an architecturally-visible floating point register file.

10. A method, comprising:
a hardware processor issuing instructions for execution, wherein the instructions are programmer-selectable from a defined instruction set architecture (ISA); and
an instruction execution unit of the processor receiving ones of said instructions for execution, wherein the instruction execution unit comprises a hardware multiplier datapath circuit, wherein the hardware multiplier datapath circuit is configured to multiply operands having a maximum number of bits M;
in response to receiving a single instance of a large-operand multiplication instruction defined within the ISA, wherein at least one of the operands of the large-operand multiplication instruction includes more than the maximum number of bits M, the instruction execution unit executing the large-operand multiplication instruction, wherein said executing comprises multiplying operands of the large-operand multiplication instruction within the hardware multiplier datapath circuit to determine a result of the large-operand multiplication instruction, such that executing the large-operand multiplication instruction to determine the result does not require execution of programmer-selected instructions within said ISA other than the large-operand multiplication instruction.

11. The method as recited in claim 10, wherein the instruction execution unit multiplying the operands of the large-operand multiplication comprises the instruction execution unit performing integer multiplication on the operands.

12. The method as recited in claim 10, wherein the instruction execution unit multiplying the operands of the large-operand multiplication comprises the instruction execution unit performing binary field multiplication on the operands.

13. The method as recited in claim 10, wherein the instruction execution unit executing the large-operand multiplication instruction to determine the result comprises the instruction execution unit iteratively performing a number of M-bit multiplication operations within the hardware multiplier datapath circuit, wherein the number of M-bit multiplication operations performed is determined dependent upon an operand size of the large-operand multiplication instruction.

14. The method as recited in claim 13, wherein the large-operand multiplication instruction specifies a variable, programmer-selectable size parameter indicative of the operand size of the large-operand multiplication instruction.

15. The method as recited in claim 10, wherein the instructions issued by the processor for execution are selected from a plurality of threads, and wherein the method further comprises:
in response to issuing the large-operand multiplication instruction from a given one of the threads, the processor preventing additional instructions from issuing from the given thread until the large-operand multiplication instruction completes execution.

16. The method as recited in claim 15, further comprising:
while preventing additional instructions from issuing from the given thread, the processor issuing one or more instructions for execution that are selected from one or more threads other than the given thread.

17. The method as recited in claim 16, wherein the one or more instructions include a given multiplication instruction other than the large-operand multiplication instruction, and wherein the method further comprises:
the instruction execution unit suspending execution of the large-operand multiplication instruction;
the instruction execution unit determining a result of the given multiplication instruction; and
the instruction execution unit resuming execution of the large-operand multiplication instruction.

18. The method as recited in claim 10, wherein the instruction execution unit executing the large-operand multiplication instruction comprises the instruction execution unit retrieving one portion of a given one of the operands from an architecturally-visible integer register file and retrieving a different portion of the given operand from an architecturally-visible floating point register file.

19. A system, comprising:
a system memory, and
a processor coupled to the system memory, wherein the processor comprises:
an instruction fetch unit configured to issue instructions for execution, wherein the instructions are programmer-selectable from a defined instruction set architecture (ISA); and
an instruction execution unit comprising a hardware multiplier datapath circuit, wherein the hardware multiplier datapath circuit is configured to multiply operands having a maximum number of bits M, and wherein the instruction execution unit is configured to receive instructions for execution from the instruction fetch unit;

wherein in response to receiving a single instance of a large-operand multiplication instruction defined within the ISA, wherein at least one of the operands of the large-operand multiplication instruction includes more than the maximum number of bits M, the instruction execution unit is configured to multiply operands of the large-operand multiplication instruction within the hardware multiplier datapath circuit to determine a result of the large-operand multiplication instruction without execution of programmer-selected instructions within said ISA other than the large-operand multiplication instruction.

20. The system as recited in claim 19, wherein the instruction fetch unit is further configured to issue a given multiplication instruction other than the large-operand multiplication instruction, and wherein in response to receiving the given multiplication instruction during execution of the large-operand multiplication instruction, the instruction execution unit is further configured to:

suspend execution of the large-operand multiplication instruction;

determine a result of the given multiplication instruction; and resume execution of the large-operand multiplication instruction.

* * * * *